Figure 1:
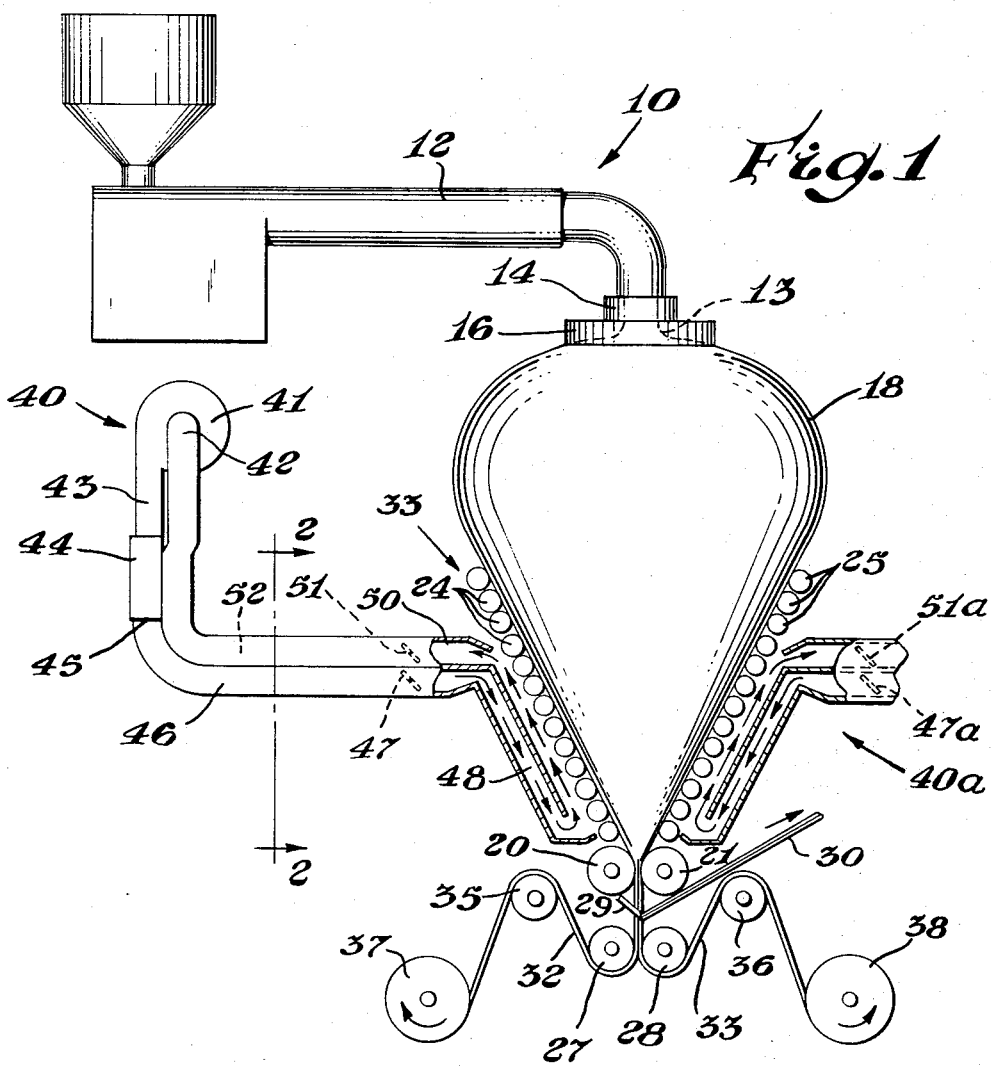

Nov. 28, 1967     C. C. BARNHART ETAL     3,355,531
METHOD AND APPARATUS FOR THE PREPARATION OF
THERMOPLASTIC RESINOUS FILM
Filed May 13, 1965

INVENTORS.
Charles C. Barnhart
Harold G. Ahlich
BY
AGENT

3,355,531
METHOD AND APPARATUS FOR THE PREPARATION OF THERMOPLASTIC RESINOUS FILM

Charles C. Barnhart, Cleveland, and Harold G. Ahlich, Fairview Park, Ohio, assignors to The Dow Chemical Company, Midland, Mich., a corporation of Delaware
Filed May 13, 1965, Ser. No. 455,392
8 Claims. (Cl. 264—95)

This invention relates to a method and apparatus for the preparation of thermoplastic resinous film. It more particularly relates to a method and the apparatus for the preparation of a heat-shrinkable flat thermoplastic resinous film by means of the trapped bubble process.

Thermoplastic resinous film is oftentimes prepared by means of the trapped bubble process wherein a tube of deformable thermoplastic material is extruded, expanded by means of a fluid under pressure to orient and stretch the tube. The resultant tube is collapsed to a flattened tube usually by means of a converging device comprising a plurality of oppositely disposed rolls which serve as a transition section between the circular configuration of the bubble to a linear configuration of the flattened tube between a pair of nip rolls which serve to close the tubing and maintain the trapped gas therein. Inherently due to the geometry of the collapsing bubble, flat film is not attained using this process as the distance from a circumference of the bubble to the corresponding location at the nip rolls is not a constant distance, that is, one portion of the bubble is forced to travel a greater distance than another portion of the bubble. The term "flat film" refers to a film in which the fiber lengths of each portion of the film in the machine direction are substantially constant. Thus, if a portion of a mill roll of film is unwound, and the edge portions appear tight while the central portion appears to have less tension or to be loose, it is referred to as being baggy film. Conversely, if a portion of the film is unwound and the central portion appears to be tight while the edge areas are without tension from the terminal portion of the film as held, it is said to be saggy film. Thus, nonflat film is subject to sag and bag which results in some serious problems when the product is employed, for example, in a printing operation where precise register must be obtained with more than one printing roll. Oftentimes a saggy or baggy film on a single printing roll will fail to give the optimum even pressure distribution required for the transfer of ink or similar printing material. Frequently, sag and bag can give significant trouble in slitting and rewinding operations resulting in nonuniform rolls, and frequently saggy or baggy film oftentimes is extremely difficult to fabricate into articles such as bags and overwraps. In many cases, minor amounts of sag or bag or out of flatness can be compensated for by stretching. Flatness is a measure of uniformity of fiber length along a given portion of film. For example, a 10 foot length of film is removed from a roll of film, and cut in a direction parallel to the edge thereof to form a plurality of narrow strips about one-half inch wide, and the length of each of the strips is measured. If the length of the strips is equal, the film is flat. If not, a measure of out of flatness is obtained. If the maximum difference in length of the various narrow ribbons were one inch, some film would be unsatisfactory for many purposes. Much of the modern printing, cutting and packaging equipment is not sufficiently versatile to handle and process a relatively inelastic film of such uneven geometry. A number of attempts have been made to overcome this non-uniformity including rotating wind-up rolls, rotating dies, rotating ovens, and the like when film is being prepared by the tube extrusion or bubble process. Various roll arrangements, heating, reheating, have been used to treat nontubular film as well as tubular film or deflated tubular film to improve the flatness thereof. These efforts have met with varying degrees of success but none has succeeded in eliminating the problem of sag and bag, except in the cases of such film which is sufficiently elastic that it may conform to printing rolls and the like. However, in cases where dimensional stability and register is concerned, the necessity of stretching such materials has given rise to other problems.

It is an object of this invention to provide a method for the preparation of synthetic resinous film in a form which is flat within acceptable commercial standards.

Another object of the invention is to provide an apparatus for producing flat thermoplastic resinous film.

It is an object of this invention to provide a method and apparatus for the preparation of thermoplastic resinous film by means of the trapped bubble process which is flat within acceptable commercial standards.

A further object of this invention is to provide a method and apparatus for the preparation of thermoplastic resinous film by the trapped bubble process wherein the film is obtained from the collapsed bubble and is inherently flat.

A further object of this invention is to provide a method and apparatus which provides for the flattening of a thermoplastic resinous film prepared by the trapped bubble process as the bubble is collapsed.

Another object of the invention is to provide a flat thermoplastic resinous film having improved physical characteristics.

These benefits and other advantages in accordance with the present invention are achieved in a process for the preparation of an oriented heat-shrinkable thermoplastic resinous film by the trapped bubble process which comprises extruding a tubular stream of heat-plastified thermoplastic resinous material, trapping a volume of fluid within the tube sufficient to cause distention and biaxial orientation of the tube, cooling the tube below the thermoplastic temperature, collapsing the tube to a flattened configuration by means of a collapsing assembly, the improvement which comprises heating the tube in the region of contact with the collapsing assembly to a sufficient degree to permit minor shrinkage thereof and subsequently removing a flat tube.

The apparatus in accordance with the invention comprises a tube forming plastics extruder, a pair of pinch rolls disposed with their nip centered transversely on the bubble center line, generally adjacent the nip rolls and disposed between the extrusion die and the nip rolls, collapsing apparatus comprising two sets of generally parallel rolls, each of the sets being generally adjacent toward the nip of the converging rolls and diverging toward the extrusion die, the improvement which comprises a heat source generally adjacent the converging rolls and adapted to supply heat to the converging rolls and the interstitial spaces therebetween.

Figure 2:
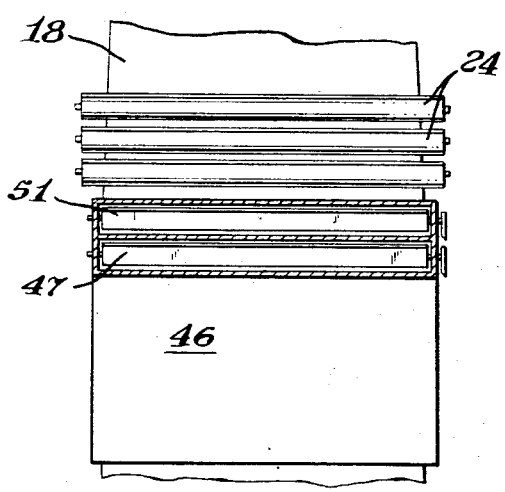

Further features and other advantages in accordance with the present invention will become more apparent from the following specification when taken in connectio with the drawing wherein:

FIGURE 1 is a schematic sectional view of an apparatus in accordance with the invention; and FIGURE 2 is a fractional view of the apparatus of FIGURE 1 taken along the line 2—2.

In FIGURE 1 there is illustrated schematically an apparatus in accordance with the present invention generally designated by the reference numeral 10. The apparatus 10 comprises in cooperative combination an extruder 12 adapted to extrude a thermoplastic resinous tube 13 from a tubing die 14, a stabilizing ring 16 is disposed generally adjacent the tube 14 and adapted to engage a film bubble 18 at a location between the die 14 and the maximum diameter of the bubble 18. Such guide rings and their function are well known in the art and serve to stabilize the bubble and prevent lateral movement thereof. A pair of nip rolls 20 and 21 are centered in the center line of extrusion of the die 14. A collapsing means generally designated by the reference numeral 23 is disposed adjacent the nip rolls 20 and 21 and between the nip rolls and extrusion die 14. The collapsing means 23 comprises a first set of rolls 24 arranged in axial parallel relationship and parallel to the nip roll 20, a second set of nip rolls 25 in parallel relationship to each other and parallel to the nip roll 21. The rolls 24 and 25 diverge toward the extrusion die 14. Remote from the die 14 and adjacent the nip rolls 20 and 21 are separating rolls 27 and 28. An edge trimmer 29 is disposed between the nip rolls 21 and 22, and the separating rolls 27 and 28. Thus, as the bubble 18 is collapsed by the collapsing assembly 23, edge portions 30 are removed therefrom and flat film portions 32 and 33 pass over idler rolls 35 and 36 and are wound onto mill rolls 37 and 38, respectively. A pair of heating assemblies 40 and 40a are disposed adjacent the rolls 24 and 25, respectively. The heating assemblies 40 and 40a are substantially identical and like parts of the assembly 40a are designated by the suffix a in FIGURE 1. The heater 40 comprises in cooperative combination a blower or air forwarding device 41 having an inlet 42 and an outlet 43. The outlet 43 is in communication with an air heater 44. The air heater 44 has a discharge 45 which is in operative communication with a hot air conduit 46. A damper or flow control device 47 is disposed within the conduit 46. The conduit 46 has a terminal or end portion 48 disposed generally adjacent the nip roll 20. An air return conduit 50 is disposed generally adjacent the converging rolls 24 and so constructed and arranged that a major portion of the rolls 24 are directly exposed to the air flowing therein. The conduit 50 has disposed therein a damper or a flow control device 51, the conduit 50 is in operative communcation with an air return conduit 52 which terminates at the inlet 42 of the air forwarding device 41.

In FIGURE 2 there is illustrated a fractional schematic view of the apparatus 10 of FIGURE 1 taken along the line 2—2 wherein the relationship of the converging rolls and the air conduits is illustrated. The practice of the method and the operation of the apparatus in accordance with the invention is believed to be best understood with reference to FIGURES 1 and 2 wherein the extruder 12 provides a thermoplastic resinous tube 13 which is inflated to form the bubble 18, the bubble 18 is collapsed by the collapsing rolls 24 and 25, in the upper zone of the bubble 18, that is, in the area where the diameter is increasing the thermoplastic resinous material is being biaxially oriented while simultaneously cooling to a relatively rigid form. As the bubble is collapsed by the converging rolls, hot gases from the heaters 40 and 40a contact the converging rolls 24 and 25 as well as the portions of film adjacent thereto causing sufficient shrinkage to occur that the resultant film is flat within the meaning of the term as hereinbefore defined.

A wide variety of oriented shrinkable film may be treated in the apparatus and by the method of the present invention. However, they are applied with particular benefit to the production of styrene polymer film or sheets wherein a polymer, e.g., polystyrene, which may have an essentially linear molecular configuration is extruded as a tube and blown by means of a trapped bubble of gas. Polystyrene, or copolymers consisting predominantly of styrene, is employed herein as being generally representative of alkenyl aromatic polymers of the type that contain at least about 50 weight percent of at least one polymerized alkenyl aromatic compound or monomer having the general formula: Ar—CR=CH$_2$ wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of α-methyl styrene, ar-methyl styrene (or vinyltoluene), the several mono- and dichlorostyrenes and ar-dimethyl styrenes, including copolymers thereof with such materials as vinylidene chloride and acrylonitrile; cross-linked, polyfunctional substances and divinylbenzene; and graft copolymers with other polymeric substances (such as other elastomeric polymers) may frequently be utilized with benefits commensurate with or in excess of those which are derivable from employment of polystyrene alone.

By way of further illustration, oriented polystyrene film having a thickness of about 2 mils is prepared employing a trapped bubble process essentially as illustrated in the accompanying figures. Hot air at a temperature of about 250° Fahrenheit is obtained from the heaters and passed through the duct work and circulated upwardly against the converging rolls. The resultant film is flat and very suitable for use as a photographic film base, whereas, if the air heaters are removed and the experiment repeated, the film is not sufficiently flat to be useful for photographic purposes. An added advantage is that a significant degree of skin orientation, that is, extreme orientation in the outer surface of the bubble is destroyed resulting in a product which is more readily heat formable by techniques such as vacuum forming and the like. Birefringence studies indicate the inner and outer surfaces of the bubble are substantially identical which is in sharp contrast to normal alkenyl aromatic film prepared by the conventional trapped bubble process. For maximum symmetry of orientation and optimum heat-forming characteristics, it is essential and critical that the air flow be upward, that is, be from the converging rolls adjacent the nip rolls toward the converging rolls remote from the nip rolls. Substantially poorer results are obtained when the direction of flow is reversed. Substitution of other heating means for hot gas such as radiant heating such as infrared heating and the like does not result in the same beneficial flattening and uniformity of orientation.

As is apparent from the foregoing specification, the method and apparatus of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In an apparatus for the preparation of a biaxially oriented film by the trapped bubble process which comprises in cooperative combination,
   a tube forming plastic extruder,
   a pair of pinch rolls disposed with their nip centered transversely on the extrusion center line,
   collapsing apparatus generally adjacent the nip rolls and disposed between an extrusion die of the extruder and the nip rolls,
   the collapsing apparatus comprising two generally oppositely disposed sets of generally parallel converging rolls, each of the sets being generally adjacent toward the nip of the nip rolls and diverging toward the extrusion die, the improvement which comprises,
   a heat source generally adjacent the converging rolls and remote from the bubble contacting sides of the sheets adapted to supply heat thereto and to interstitial spaces between the rolls sufficient to cause minor shrinkage of a biaxially oriented thermoplastic resinous film from the extruder as the film passes over the rolls of the collapsing apparatus.

2. The apparatus of claim 1 wherein the heat source comprises a source of heated gas, means to conduct said heated gas from a location generally adjacent the nip rolls along the converging rolls toward the extruder, and means to remove the heated gas from the converging rolls at a location remote from the nip rolls.

3. The apparatus of claim 1 wherein the heat source comprises a first heating assembly and a second heat assembly being disposed adjacent the converging rolls, a heating assembly comprising in cooperative combination, an air forwarding device having an inlet end and outlet end, an air heater, a conduit to receive hot air from the air heater and the air forwarding device, the conduit terminating generally adjacent the converging rolls and the nip rolls, an air return conduit adapted to return air to the air forwarding device and header means to maintain heated air from the supply conduit generally adjacent the converging rolls and guide the air to the air return conduit.

4. The apparatus of claim 3 including an airflow device to control the volume of air passing through the heater.

5. In a method for the extrusion of biaxially oriented heat-shrinkable thermoplastic resinous film by the trapped bubble process which comprises, extruding a tubular stream of a heat-plastified thermoplastic resinous material, trapping the fluid within the tube sufficient to cause distention and biaxial orientation to the tube, cooling the tube below the thermoplastic temperature, collapsing the tube to a flattened configuration by means of a collapsing assembly, the collapsing assembly converging away from a source supplying the tubular stream, the improvement which comprises heating the tube in a region of contact with the converging collapsing assembly to a sufficient degree to permit minor shrinkage thereof and subsequently removing a flat tube.

6. The method of claim 5 wherein the tube is heated by means of hot gas.

7. The method of claim 6 wherein the tube is heated by passing the hot gas from a location generally adjacent the flattened position of the bubble means.

8. The method of claim 7 wherein the heating of the bubble is sufficient that flattened tube produces a flat film.

References Cited

UNITED STATES PATENTS

| | | | |
|---|---|---|---|
| 2,697,852 | 12/1954 | Bailey | 264—95 |
| 2,955,318 | 10/1960 | Cook et al. | 264—95 X |
| 3,061,876 | 11/1962 | Lloyd et al. | 264—95 |
| 3,170,012 | 2/1965 | Stinchcombe | 264—95 |

FOREIGN PATENTS 219,106   12/1958   Australia.

ROBERT F. WHITE, *Primary Examiner.*

A. R. NOË, *Assistant Examiner.*